UNITED STATES PATENT OFFICE.

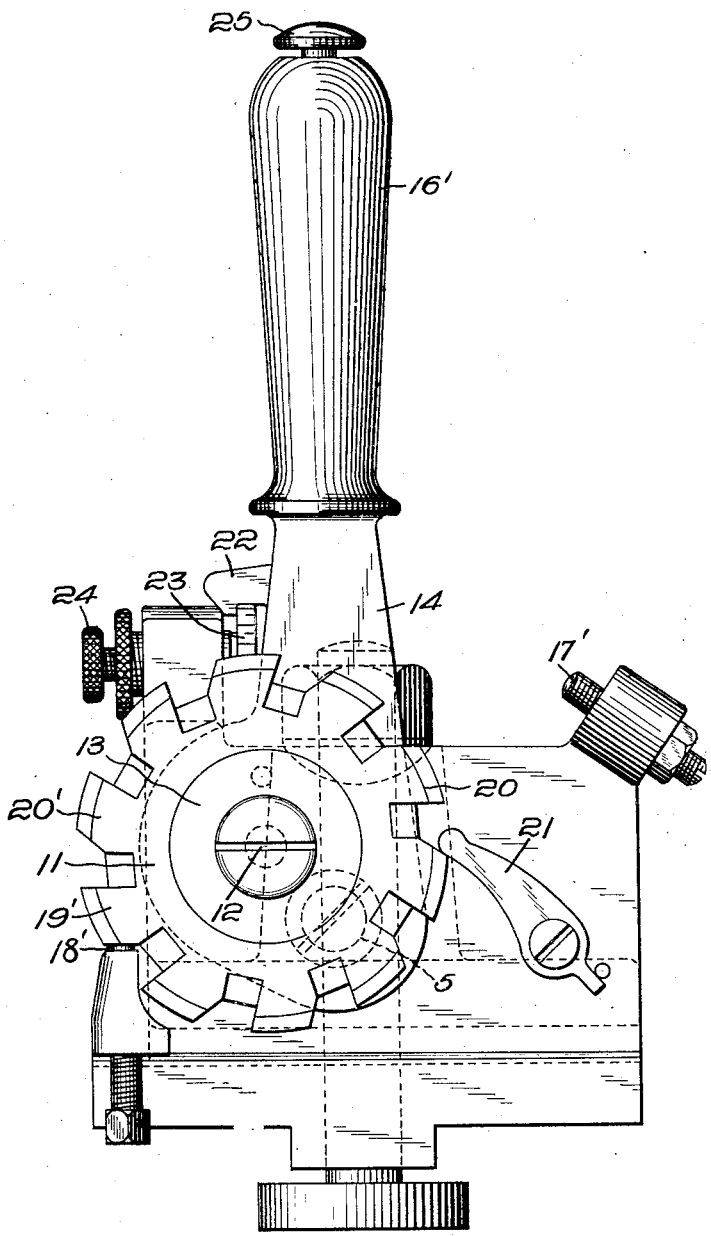

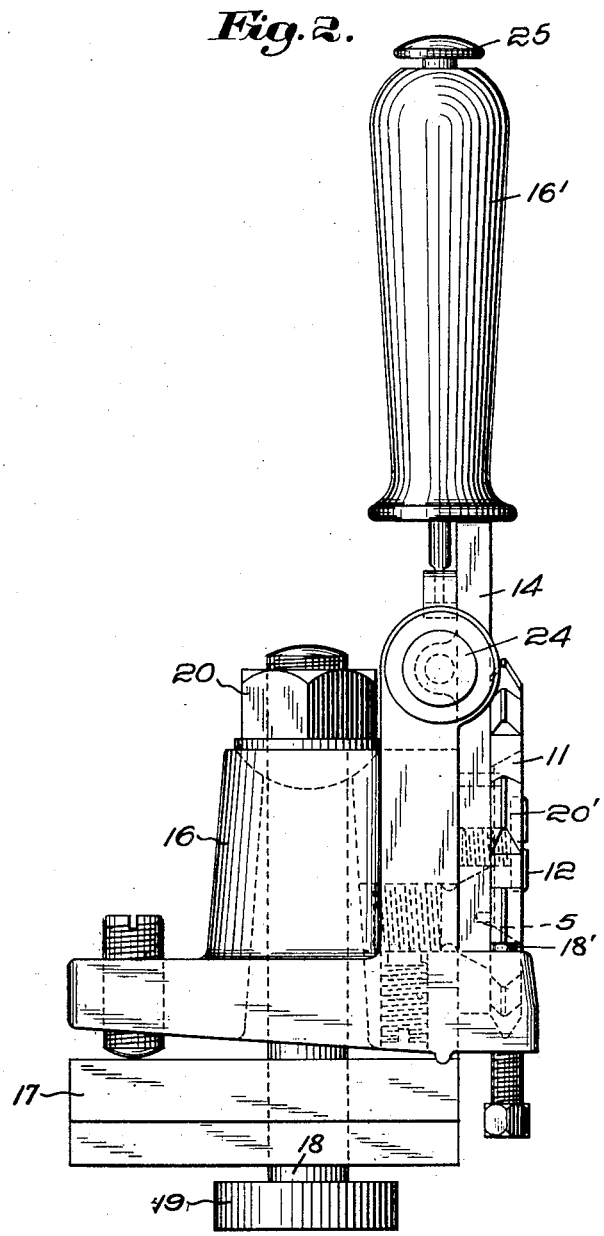

FREDERICK H. HALSTEAD, OF BOSTON, MASSACHUSETTS, ASSIGNOR TO RIVETT LATHE AND GRINDER COMPANY, OF BOSTON, MASSACHUSETTS, A CORPORATION OF MASSACHUSETTS.

LATHE-TOOL.

1,342,745.     Specification of Letters Patent.     Patented June 8, 1920.

Application filed February 24, 1919. Serial No. 278,749.

*To all whom it may concern:*

Be it known that I, FREDERICK H. HALSTEAD, a citizen of the United States, and a resident of Boston, in the county of Suffolk and State of Massachusetts, have invented an Improvement in Lathe-Tools, of which the following description, in connection with the accompanying drawings, is a specification, like characters on the drawings representing like parts.

This invention pertains to improvements in metal working apparatus, and more particularly, though not exclusively, to thread cutting tools and apparatus for presenting such tools to the work. The type of tool to which my invention is particularly applicable is that disclosed in the patent to Herman Dock, numbered 632,678, and in the patent to Edward Rivett, numbered 652,643, wherein a cutter disk is used which has a plurality of cutting points which increase progressively in length and which are adapted to be progressively presented to the work to cut screw threads and the like. The invention pertains to the same class of apparatus as that disclosed in my issued Patents Nos. 1,299,710 and 1,299,712, both issued April 8th, 1919.

In the drawings, which show a preferred construction of one illustrative embodiment of my invention :—

Figure 1 is a side elevation showing the cutter and its improved holder; and

Fig. 2 is an end elevation viewed from the left of Fig. 1.

In the illustrative embodiment of my invention shown in the drawings, I provide a cutter disk 11, and a plurality of cutter points, herein shown as ten, which cutting points are of progressively increasing length and of the general type shown in patent to Herman Dock, 632,678. These cutting points are adapted to be progressively presented to the work by the following mechanism:

The cutter disk lip is rotatably mounted for step-by-step rotation about an axis 12, preferably being rotatable on a non-rotatable arbor 13 centered on the axis 12. The arbor 13 and parts carrying the cutter disk 11 are mounted direct on a lever 14, which may be fulcrumed at 15 to the body portion 16 of the tool. The body portion 16 of the tool may be carried by a base block 17 adapted to fit on the tool carriage of a lathe and to be secured thereto by a bolt 18, of which the head 19 may fit the T-slot in the tool carriage. The tool holder may be secured in position by tightening the nut 20 on the bolt 18. The lever 14 carrying the cutter disk may be provided at its top with a handle 16' and is adapted to oscillate from the position shown in Fig. 1 to a position in which the lever will abut against the stop screw 17', thereby moving the cutter disk in an arc of a circle about the axis of the fulcrum 5 of the lever 14. This upward and rearward movement of the cutter disk moves the cutter disk away from the support 18' on which the cutting tooth 19' rests, and brings the cutting tooth 20' into contact with the pawl 21, thus, by a continued backward movement of the lever 14, turning the cutter disk in a contraclockwise direction, as viewed in Fig. 1, and bringing the cutting tooth 20' into such position that when the lever 14 is again moved forwardly to the position shown in Fig. 1, the cutter tooth 20' will rest on the cutter tooth support 18'. The lever 14 is then held in forward or cutting position by the latch 22 engaging an adjustable abutment 23, further forward movement of the lever being opposed by the inner end of the abutment screw 24. The latch 22 is disengageable from the latch-engaging part 23 by pressure on the abutment 25 at the top of the handle 16, as shown in my previous applications before mentioned.

One of the principal advantages of the preferred form of my invention, shown in the drawings, is that the lever 14 is on the same side of the body portion of the tool on which the cutter disk is located, the cutter disk, in fact, being carried by the lever. This provides a very simple construction having few wearing parts, economical to manufacture and very rigid in use.

While I have shown and described a preferred form of one embodiment of my invention, it will be understood that major changes involving omission, substitution, alteration and reversal of parts, and even changes in the mode of operation, may be made without departing from the scope of my invention, which is best defined in the following claims.

Claims:

1. In a lathe tool, the combination of a body or frame, an oscillatory lever, a cutter disk providing a plurality of progressively increasing cutting points and located on the same side of the frame with said lever, and means effective at each oscillation of said lever for imparting step-by-step rotation to said cutter disk, thereby progressively to present said progressively increasing cutting points to the work.

2. In a lathe tool, the combination of a body or frame, an oscillatory lever, a cutter disk providing a plurality of progressively increasing cutting points and located on the same side of the frame with said lever and carried thereby, and means effective at each oscillation of said lever for imparting step-by-step rotation to said cutter disk, thereby progressively to present said progressively increasing cutting points to the work.

In testimony whereof I have signed my name to this specification.

FREDERICK H. HALSTEAD.